(12) United States Patent
Kamiya (10) Patent No.: US 10,778,881 B2
(45) Date of Patent: *Sep. 15, 2020

(54) VIDEO SIGNAL PROCESSING DEVICE, VIDEO SIGNAL PROCESSING METHOD, AND CAMERA DEVICE

(71) Applicant: SONY CORPORATION, Tokyo (JP)

(72) Inventor: Koji Kamiya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/550,619

(22) Filed: Aug. 26, 2019

(65) Prior Publication Data

US 2019/0379820 A1 Dec. 12, 2019

Related U.S. Application Data

(63) Continuation of application No. 15/107,526, filed as application No. PCT/JP2014/083487 on Dec. 17, 2014, now Pat. No. 10,469,729.

(30) Foreign Application Priority Data

Jan. 9, 2014 (JP) ................................ 2014-002202

(51) Int. Cl.
*H04N 5/232* (2006.01)
*H04N 5/14* (2006.01)
*H04N 7/01* (2006.01)

(52) U.S. Cl.
CPC ......... *H04N 5/23212* (2013.01); *H04N 5/142* (2013.01); *H04N 5/23232* (2013.01);
(Continued)

(58) Field of Classification Search
CPC ............ H04N 5/23212; H04N 5/23232; G06T 2207/10016
See application file for complete search history.

(56) References Cited

U.S. PATENT DOCUMENTS 5,496,106 A 3/1996 Anderson
7,602,440 B2 * 10/2009 Nishi ....................... H04N 7/01
348/241

(Continued)

FOREIGN PATENT DOCUMENTS

EP 1526713 A2 4/2005
JP 2000-113164 A 4/2000
(Continued)

OTHER PUBLICATIONS

Extended European Search Report of EP Patent Application No. 14877618.0, dated Jul. 17, 2017, 13 pages.

(Continued)

*Primary Examiner* — Luong T Nguyen
(74) *Attorney, Agent, or Firm* — Chip Law Group (57) ABSTRACT

The present technology allows for easily checking whether a moving part is in focus. A video signal at a first frame rate is acquired from a captured video signal at a second frame rate N times higher than the first frame rate. N is an integer larger than or equal to two. Each frame of the captured video signal at the second frame rate is filtered in horizontal and vertical high pass filter processes so that an edge signal is detected. An edge signal corresponding to each frame at the first frame rate is generated in accordance with the edge signal of each frame. Synthesizing the generated edge signal onto the video signal at the first frame rate provides a video signal for a viewfinder display.

20 Claims, 5 Drawing Sheets

(52) U.S. Cl.
CPC .................. *H04N 5/23293* (2013.01); *G06T 2207/10016* (2013.01); *H04N 7/0127* (2013.01)

(56) References Cited

U.S. PATENT DOCUMENTS

| | | | |
|---|---|---|---|
| 8,144,255 B2 | | 3/2012 | Hirayama et al. |
| 9,013,584 B2* | | 4/2015 | Petrides .................. G06T 5/005 348/208.4 |
| 10,469,729 B2* | | 11/2019 | Kamiya ............. H04N 5/23293 |
| 2004/0233300 A1 | | 11/2004 | Satoh |
| 2008/0278602 A1 | | 11/2008 | Otsu |
| 2009/0167920 A1 | | 7/2009 | Tanaka |
| 2010/0039539 A1* | | 2/2010 | Kinoshita ............... G06T 5/006 348/242 |
| 2011/0122286 A1 | | 5/2011 | Yamada et al. |
| 2011/0187916 A1 | | 8/2011 | Koh |
| 2013/0033593 A1 | | 2/2013 | Chinnock et al. |
| 2013/0076968 A1 | | 3/2013 | Ueda et al. |
| 2017/0052836 A1 | | 2/2017 | Horabin et al. |

FOREIGN PATENT DOCUMENTS

| | | |
|---|---|---|
| JP | 2005-006283 A | 1/2005 |
| JP | 2006-285358 A | 10/2006 |
| JP | 2007-060328 A | 3/2007 |
| JP | 2007-124279 A | 5/2007 |
| JP | 2007-295525 A | 11/2007 |
| JP | 2008-295022 A | 12/2008 |
| JP | 2010-268354 A | 11/2010 |
| JP | 2013-058850 A | 3/2013 |
| WO | 2001/026051 A1 | 4/2001 |

OTHER PUBLICATIONS

Clarke, et al., "Using High Frame Rate CMOS Sensors for Three-Dimensional Eye Tracking", Behavior Research Methods, Instruments & Computers, 2002, vol. 34, No. 4, Nov. 2002, pp. 549-560.

International Search Report and Written Opinion of PCT Application No. PCT/JP2014/083487, dated Mar. 31, 2015, 06 pages of English Translation and 06 pages of ISRWO.

International Preliminary Report on Patentability of PCT Application No. PCT/JP2014/083487, dated Jul. 21, 2016, 06 pages of English Translation and 03 pages of IPRP.

Non-Final Office Action for U.S. Appl. No. 15/107,526, dated Sep. 27, 2017, 14 pages.

Non-Final Office Action for U.S. Appl. No. 15/107,526, dated Jan. 25, 2019, 15 pages.

Final Office Action for U.S. Appl. No. 15/107,526, dated May 8, 2018, 11 pages.

Advisory Action for U.S. Appl. No. 15/107,526, dated Jul. 25, 2018, 02 pages.

Notice of Allowance for U.S. Appl. No. 15/107,526, dated Jun. 28, 2019, 08 pages.

Office Action for JP Patent Application No. 2018-224409, dated Oct. 29, 2019, 03 pages of Office Action and 04 pages of English Translation.

* cited by examiner

TIME →

VIDEO SIGNAL PROCESSING DEVICE, VIDEO SIGNAL PROCESSING METHOD, AND CAMERA DEVICE

CROSS-REFERENCE TO RELATED APPLICATION

The present application is a continuation application of U.S. patent application Ser. No. 15/107,526, filed Jun. 23, 2016, which is a national stage entry of PCT/JP2014/083487, filed Dec. 17, 2014, which claims priority from prior Japanese Priority Patent Application JP 2014-002202 filed in the Japan Patent Office on Jan. 9, 2014, the entire contents of which are hereby incorporated by reference.

TECHNICAL FIELD

The present technology relates to a video signal processing device, a video signal processing method, and a camera device and, in particular, relates to a video signal processing device that processes a high-frame-rate video signal.

BACKGROUND ART

Camera devices that can capture a video at a high frame rate have been proposed (for example, see Patent Document 1). The camera device acquires a video signal for a viewfinder display by converting the high-frame-rate video signal into a normal-frame-rate video signal (a normal speed video signal).

A function to highlight the edge signal (high-frequency components) extracted from the video signal for a viewfinder display in order to use the edge signal as a marker to facilitate the operation of manually bringing the camera into focus with the viewfinder (for example, the PEAKING function, or the VF-DETAIL function) has been known (for example, see Patent Document 2). Using this technique can check whether the camera is in focus by checking the highlighted edge because there is a drastic change in the signal level of the part in focus (edge).

CITATION LIST

Patent Documents

Patent Document 1: Japanese Patent Application Laid-Open No. 2010-268354
Patent Document 2: Japanese Patent Application Laid-Open No. 2007-060328

SUMMARY OF THE INVENTION

Problems to be Solved by the Invention

Moving image blurring occurs in the part that moves fast on a screen. Thus, there is a loss of the edge signal (high-frequency components) in the video signal for a viewfinder display. This makes it difficult to detect the edge signal (high-frequency components) and check from the highlight of the edge signal whether the fast moving part is in focus. Note that, however, there is a need to make especially the moving part come into focus because the edge signal is used in the camera device capable of capturing a video at a high frame rate in order to show the part moving fast in slow motion.

An objective of the present technology is to allow for easily checking whether a moving part is in focus.

Solutions to Problems

A concept of the present technology lies in a video signal processing device including:
an edge signal detection unit that detects an edge signal by filtering each frame in a video signal at a second frame rate N times higher than a first frame rate in horizontal and vertical high pass filter processes, the N being an integer larger than or equal to two; and
an edge signal generation unit that generates an edge signal corresponding to each frame at the first frame rate in accordance with an edge signal of each frame detected with the edge signal detection unit.

The edge signal detection unit according to the present technology filters each frame of a video signal at a second frame rate N times higher than a first frame rate in horizontal and vertical high pass filter processes so as to detect an edge signal. N is an integer larger than or equal to two. The edge signal generation unit generates an edge signal corresponding to each frame at the first frame rate in accordance with the edge signal of each frame detected with the edge signal detection unit. For example, the second frame rate can be 200 Hz.

Further, for example, the edge signal generation unit may perform an arithmetic process to find a difference absolute value between the edge signals of each frame and an adjacent frame, using the edge signal of each frame detected with the edge signal detection unit, and generate an edge signal of a frame from some or all of the difference absolute values of the edge signals of the frames every N frames. Further, for example, the edge signal generation unit may generate an edge signal of a frame from some or all of the edge signals of the frames every N frames, using the edge signal of each frame detected with the edge signal detection unit.

According to the present technology, an edge signal corresponding to each frame at the first frame rate (the normal frame rate) is generated in accordance with the edge signal detected in each frame in the video signal at the second frame rate (the high frame rate). This generation can prevent, for example, the effect of moving image blurring. Thus, the edge signal corresponding to the edge of the moving part as the edge signal corresponding to each frame at the first frame rate in good condition.

In the present technology, the video signal processing device may further include: a color conversion unit that converts an edge signal of each frame generated with the edge signal generation unit into a color signal of a predetermined color and outputs the color signal. This color conversion unit enables an edge highlight display with the predetermined color, using the edge signal.

Another concept of the present technology lies in a camera device including:
a frame rate conversion unit that provides a video signal at a first frame rate from a captured video signal at a second frame rate N times higher than the first frame rate, the N being an integer larger than or equal to two;
an edge signal detection unit that detects an edge signal by filtering each frame in the captured video signal at the second frame rate in horizontal and vertical high pass filter processes;
an edge signal generation unit that generates an edge signal corresponding to each frame at the first frame rate in accordance with the edge signal of each frame detected with the edge signal detection unit; and a signal synthesis unit that provides a video signal at the first frame rate for a viewfinder display by synthesizing an edge signal corresponding to each frame at the first frame rate and generated with the edge signal generation unit onto the video signal at the first frame rate provided by the frame rate conversion unit.

The frame rate conversion unit according to the present technology provides a video signal at a first frame rate from a captured video signal at a second frame rate N times higher than the first frame rate. N is an integer larger than or equal to two. For example, the second frame rate can be higher than or equal to 200 Hz.

The edge signal detection unit filters each frame in the captured video signal at the second frame rate in horizontal and vertical high pass filter processes so as to detect an edge signal. The edge signal generation unit generates an edge signal corresponding to each frame at the first frame rate in accordance with the edge signal of each frame detected with the edge signal detection unit.

For example, the edge signal generation unit may perform an arithmetic process to find a difference absolute value between the edge signals of each frame and an adjacent frame, using the edge signal of each frame detected with the edge signal detection unit, and generate an edge signal of a frame from some or all of the difference absolute values of the edge signals of the frames every N frames. Further, for example, the edge signal generation unit may generate an edge signal of a frame from some or all of the edge signals of the frames every N frames, using the edge signal of each frame detected with the edge signal detection unit.

The signal synthesis unit provides a video signal at the first frame rate for a viewfinder display by synthesizing the edge signal corresponding to each frame at the first frame rate and generated with the edge signal generation unit onto the video signal at the first frame rate provided by the frame rate conversion unit.

According to the present technology, an edge signal corresponding to each frame at the first frame rate (the normal frame rate) is generated in accordance with the edge signal detected in each frame in the video signal at the second frame rate (the high frame rate). The generated edge signal is synthesized onto the video signal at the first frame rate. This synthesis provides a video signal for a viewfinder display. Thus, for example, the effect of moving image blurring can be prevented. The edge signal of the moving part can be provided as the edge signal corresponding to each frame at the first frame rate in good condition. Thus, the edge of the moving part can also be highlighted with the edge signal in good condition.

In the present technology, for example, the camera device may further include: a color conversion unit that converts an edge signal of each frame generated with the edge signal generation unit into a color signal of a predetermined color and outputs the color signal, and the signal synthesis unit may provide a video signal at the first frame rate for a viewfinder display by synthesizing the color signal of the predetermined color corresponding to each frame at the first frame rate and output from the color conversion unit onto the video signal at the first frame rate provided by the frame rate conversion unit. In this example, the color conversion unit can determine the predetermined color, for example, in accordance with a selection signal from the user operation unit. The display of the edge information with the edge signal can be performed, for example, with the predetermined color selected by the user.

Further, another concept of the present technology lies in a camera device including:

a frame rate conversion unit that provides a video signal at a first frame rate from a captured video signal at a second frame rate N times higher than the first frame rate, the N being an integer larger than or equal to two;

a first edge signal detection unit that detects an edge signal by filtering each frame in the captured video signal at the second frame rate in horizontal and vertical high pass filter processes;

an edge signal generation unit that generates a first edge signal corresponding to each frame at the first frame rate in accordance with the edge signal of each frame detected with the first edge signal detection unit;

a second edge signal detection unit that detects a second edge signal corresponding to each frame at the first frame rate by filtering each frame in the video signal at the first frame rate provided by the frame rate conversion unit in horizontal and vertical high pass filter processes; and a signal processing unit that outputs a video signal at the first frame rate for a viewfinder display by synthesizing the first edge signal generated with the edge signal generation unit, the second edge signal detected with the second edge signal detection unit, or a third edge signal provided by combining the first edge signal and the second edge signal onto a video signal at the first frame rate provided by the frame rate conversion unit.

The frame rate conversion unit according to the present technology provides a video signal at a first frame rate from a captured video signal at a second frame rate N times higher than the first frame rate. N is an integer larger than or equal to two. For example, the second frame rate can be higher than or equal to 200 Hz. The first edge signal detection unit filters each frame in the captured video signal at the second frame rate in horizontal and vertical high pass filter processes so as to detect an edge signal.

The edge signal generation unit generates a first edge signal corresponding to each frame at the first frame rate in accordance with the edge signal of each frame detected with the first edge signal detection unit. The second edge signal detection unit filters each frame in the video signal at the first frame rate provided by the frame rate conversion unit in horizontal and vertical high pass filter processes so as to detect a second edge signal corresponding to each frame at the first frame rate.

The signal processing unit outputs a video signal at the first frame rate for a viewfinder display by synthesizing the first edge signal, the second edge signal, or a third edge signal provided by combining the first edge signal and the second edge signal onto the video signal at the first frame rate provided by the frame rate conversion unit. For example, the signal processing unit may selectively output one of the first edge signal, the second edge signal, and the third edge signal in accordance with a selection signal from a user operation unit.

As described above according to the present technology, the first edge signal, the second edge signal, or the third edge signal provided by combining the first edge signal and the second edge signal is synthesized onto the video signal at the first frame rate. The synthesized signal is output as a video signal at the first frame rate for a viewfinder display. Thus, an image in which the edge of only the moving part, the edge of only the stationary part, or both edges of the parts are highlighted by the edge highlight display with the edge signals can be displayed in the viewfinder.

Effects of the Invention

According to the present technology, whether the moving part is in focus can be easily checked. Note that the effects described herein are merely examples and the effects of the present technology are not limited to the described effects. The present technology can have an additional effect.

MODE FOR CARRYING OUT THE INVENTION

The mode for carrying out the invention (hereinafter, referred to as an "embodiment") will be described hereinafter. Note that the embodiment will be described in the following order.
1. Embodiment
2. Exemplary Variation 1. Embodiment

[Exemplary Configuration of Camera Device]

Figure 1:
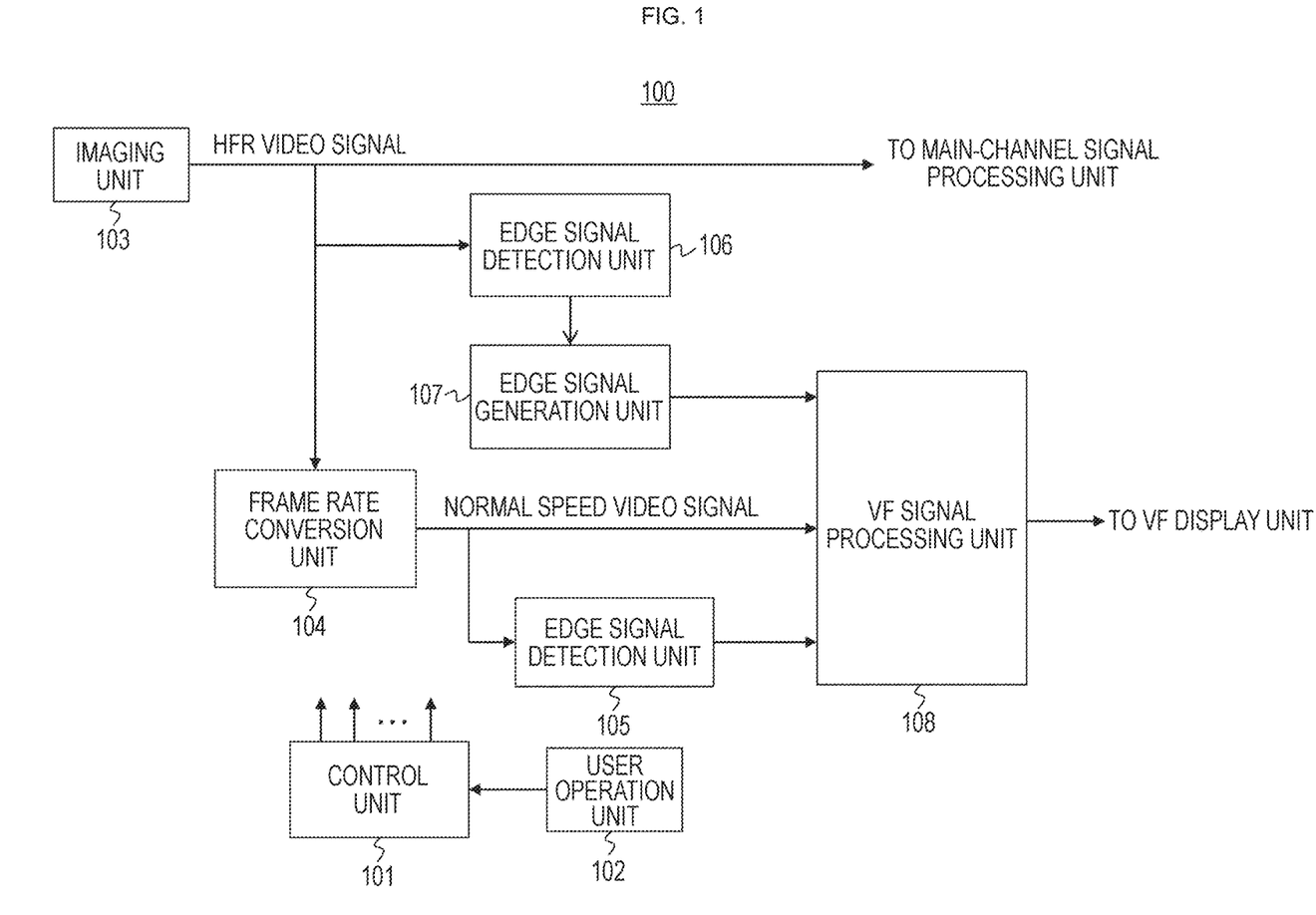
FIG. 1 is a block diagram of an exemplary configuration of a camera device as an embodiment.

FIG. 1 is an exemplary configuration of a camera device 100 as an embodiment. The camera device 100 includes a control unit 101, a user operation unit 102, an imaging unit 103, a frame rate conversion unit 104, an edge signal detection unit 105, an edge signal detection unit 106, an edge signal generation unit 107, and a VF signal processing unit 108.

The control unit (camera CPU) 101 controls the operation of each unit in the camera device 100. The user operation unit 102 is connected to the control unit 101 so as to form a user interface for various types of user operation.

The imaging unit 103 includes an image sensor such as a Complementary Metal-Oxide Semiconductor (CMOS) or a Charge Coupled Device (CCD) so as to output a high-frame-rate video signal (HFR video signal). The output HFR video signal is transmitted to a main-channel signal processing unit. The frame rate of the HFR video signal is N times higher than the frame rate of a normal speed video signal (normal-frame-rate video signal). N is an integer larger than or equal to two. In the present embodiment, the frame rate of the normal speed video signal is 60 Hz, and the frame rate of the HFR video signal is four times higher than the frame rate and thus is 240 Hz.

The frame rate conversion unit 104 is configured with, for example, a frame memory so as to provide a normal speed video signal at a frame rate of 60 Hz from an HFR video signal at a frame rate of 240 Hz. In the example, the frame rate conversion unit 104 generates a video signal of a frame of the normal speed video signal by summing the video signals of four frames every four frames in the HFR video signal. Note that a video signal of a frame of the normal speed video signal can be provided every four frames in the HFR video signal with video signals of three or two frames or a video signal of a frame instead of all of the video signals of the four frames.

Figure 2A:
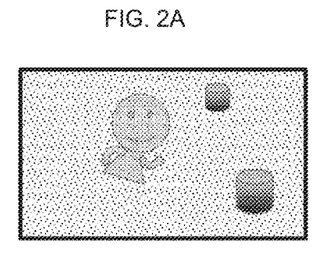
FIGS. 2A, 2B, 2C, 2D, and 2E are explanatory diagrams of HFR video signals and normal speed video signals.
Figure 2B:
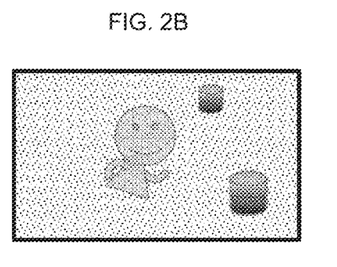
Figure 2C:
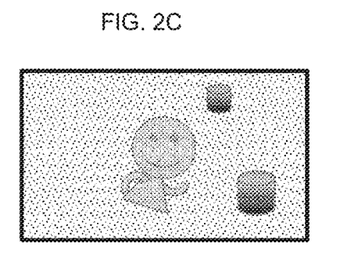
Figure 2D:
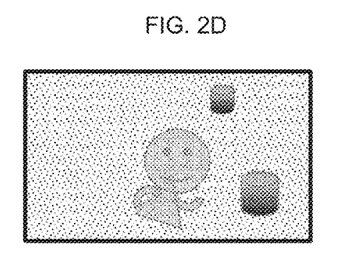
Figure 2E:
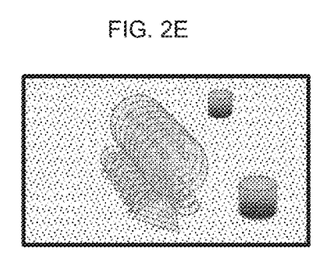

FIGS. 2A, 2B, 2C, and 2D illustrate exemplary images of four frames in an HFR video signal output from the imaging unit 103. In FIGS. 2A, 2B, 2C, and 2D, a "person" forms a moving part and "cylinders" form a stationary part. FIG. 2E illustrates an exemplary image of a frame in a normal speed video signal provided by the frame rate conversion unit 104. The example illustrates that the video signals of four frames are summed in a unit of four frames in the HFR video signal so that a video signal of a frame in the normal speed video signal.

Figure 3A:
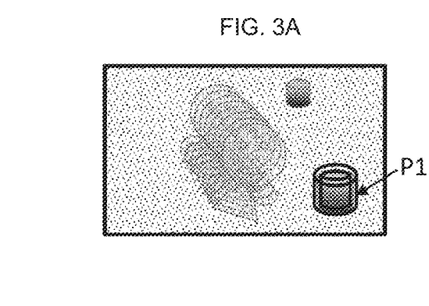
FIGS. 3A, 3B, 3C, 3D, and 3E are explanatory diagrams of a process for detecting and generating an edge signal.
Figure 3B:
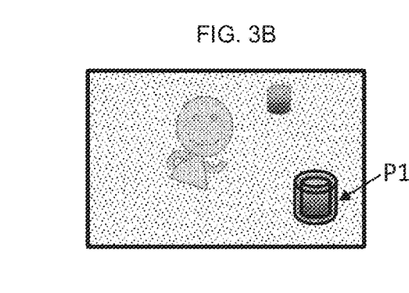
Figure 3C:
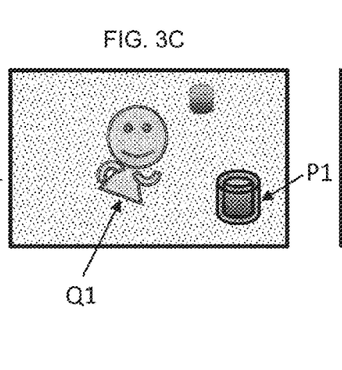
Figure 3D:
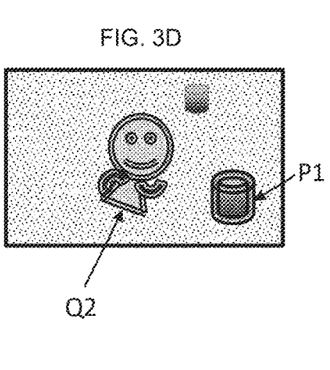
Figure 3E:
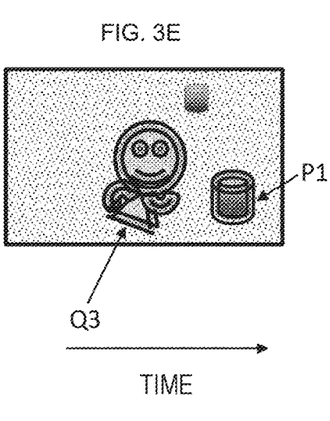

The edge signal detection unit 105 filters each frame in the normal speed video signal at a frame rate of 60 Hz provided by the frame rate conversion unit 104 in horizontal and vertical high pass filter processes so as to detect an edge signal corresponding to each frame at the frame rate of 60 Hz. FIG. 3A illustrates an exemplary edge signal of a frame detected with the edge signal detection unit 105.

This example illustrates that a focused point is near the stationary part of the front "cylinder". The edge signal corresponding to the edge of the "cylinder" is detected (see an arrow P1). However, moving image blurring occurs because the "person" is the moving part. Thus, the edge signal corresponding to the edge of the "person" is not detected.

The edge signal detection unit 106 filters each frame in the HFR video signal at a frame rate of 240 Hz output from the imaging unit 103 in horizontal and vertical high pass filter processes so as to detect an edge signal corresponding to each frame at the frame rate of 240 Hz. FIGS. 3B, 3C, 3D, and 3E illustrate exemplary edge signals of the four frames detected with the edge signal detection unit 106.

Figure 4A:
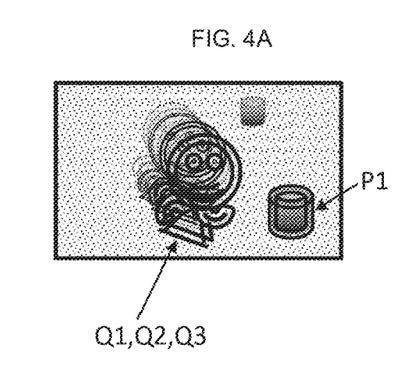
FIGS. 4A, 4B, 4C, 4D, and 4E are explanatory diagrams of a process for detecting and generating an edge signal.
Figure 4B:
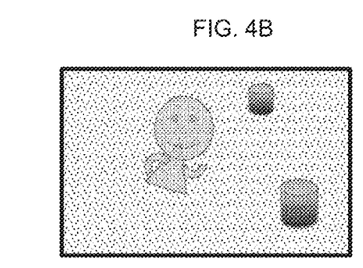
Figure 4C:
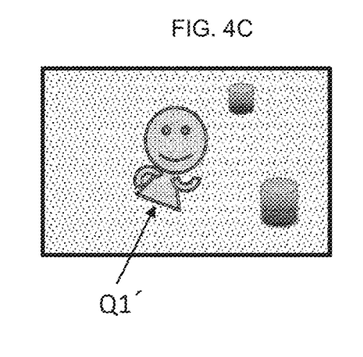
Figure 4D:
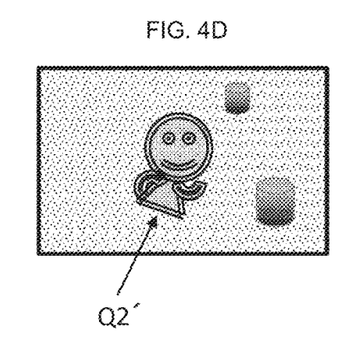
Figure 4E:
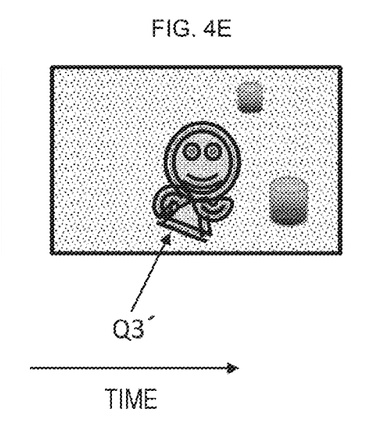

This example illustrates that a focused point is near the stationary part of the front "cylinder". The edge signal corresponding to the edge of the "cylinder" is detected (see the arrow P1). Meanwhile, the high frame rate decreases the moving image blurring, and thus the edge signals corresponding to the edge of the "person" are also detected (see arrows Q1, Q2, and Q3). FIG. 4A illustrates the state in which the edge signals of the four frame detected with the edge signal detection unit 106 and illustrated in FIGS. 3B, 3C, 3D, and 3E are summed. Note that the "cylinder" and "person" are illustrated as references indicating the detection positions at which the edge signals (difference absolute values) are detected in FIGS. 3A, 3B, 3C, 3D, 3E, and 4A.

The edge signal generation unit 107 performs an arithmetic process to find the difference absolute value between the edge signals of each frame and the adjacent frame, using the edge signal of each frame detected with the edge signal detection unit 106. Taking the difference absolute values as described above can offset and remove the edge signals corresponding to the stationary part.

FIGS. 4B, 4C, 4D, and 4E illustrates exemplary difference absolute values among the four frames generated with the edge signal generation unit 107. The edge signals corresponding to the edge of the "cylinder" that is the stationary part are removed and the edge signals corresponding to the edge of the "person" that is the moving part remain as illustrated in the drawings (see arrows Q1', Q2', and Q3'). Note that the "cylinder" and "person" are illustrated as references indicating the detection positions at which the edge signals (difference absolute values) are detected in FIGS. 4B, 4C, 4D, and 4E.

The edge signal generation unit 107 sums the difference absolute values of the four frames every four frames, and generates an edge signal corresponding to each frame at a frame rate of 60 Hz. Note that the edge signal generation unit 107 can generate the edge signal of a frame every four frames using the difference absolute values of three or two frames, or the difference absolute value of a frame instead of all of the difference absolute values of the four frames.

The VF signal processing unit 108 synthesizes the edge signal corresponding to each frame at a frame rate of 60 Hz and generated with the edge signal generation unit 107 onto the normal speed video signal at a frame rate of 60 Hz provided by the frame rate conversion unit 104 so as to generate a first video signal for a viewfinder display. In this example, the VF signal processing unit 108 synthesizes the edge signal onto the video signal so that the edge is highlighted (for example, by a bright display or a display with a predetermined color including white).

For example, in order to display the edge with a predetermined color, the VF signal processing unit 108 converts the edge signal into a color signal of a predetermined color and synthesizes the color signal onto the video signal. In this example, the VF signal processing unit 108 determines the predetermined color in accordance with the selection signal from the user operation unit 102. In other words, the user can set the color that the user desires as the predetermined color by operating the user operation unit 102.

The VF signal processing unit 108 synthesizes the edge signal corresponding to each frame at a frame rate of 60 Hz and detected with the edge signal detection unit 105 onto the normal speed video signal at a frame rate of 60 Hz provided by the frame rate conversion unit 104 so as to generate a second video signal for a viewfinder display. In this example, the VF signal processing unit 108 synthesizes the edge signal onto the video signal so that the edge is highlighted (for example, by a bright display or a display with a predetermined color including white).

The VF signal processing unit 108 synthesizes both of the edge signal corresponding to each frame at a frame rate of 60 Hz and generated with the edge signal generation unit 107 (the first edge signal) and the edge signal corresponding to each frame at a frame rate of 60 Hz and detected with the edge signal detection unit 105 (the second edge signal) onto the normal speed video signal at a frame rate of 60 Hz provided by the frame rate conversion unit 104 so as to generate a third video signal for a viewfinder display.

In this example, the VF signal processing unit 108 synthesizes the edge signal onto the video signal so that the edge is highlighted (for example, by a bright display or a display with a predetermined color including white). For example, in order to display the edge with a predetermined color, the VF signal processing unit 108 can distinguish the highlighted edge with the first edge signal from the highlighted edge with the second edge signal by changing the color phases.

Then, the VF signal processing unit 108 outputs one of the first video signal, the second video signal, and the third video signal and transmits the output signal to a VF display unit (the viewfinder). In this example, the VF signal processing unit 108 determines the video signal for a viewfinder display to be output in accordance with the selection signal from the user operation unit 102. In other words, the user can set the video signal for a viewfinder display to be transmitted to the VF display unit (the viewfinder) by operating the user operation unit 102.

The operation of the camera device 100 illustrated in FIG. 1 will briefly be described. An HFR video signal at a frame rate of 240 Hz is provided from the imaging unit 103 (see FIGS. 2A, 2B, 2C, and 2D). The HFR video signal is transmitted to the main-channel signal processing unit and provided to the frame rate conversion unit 104 and the edge signal detection unit 106.

The frame rate conversion unit 104 coverts the frame rates in a conversion process so that a normal speed video signal at a frame rate of 60 Hz is acquired from the HFR video signal at a frame rate of 240 Hz (see FIG. 2E). The acquired normal speed video signal is provided to the edge signal detection unit 105 and the VF signal processing unit 108.

The edge signal detection unit 105 filters each frame in the normal speed video signal at a frame rate of 60 Hz in horizontal and vertical high pass filter processes so as to detect an edge signal corresponding to each frame at a frame rate of 60 Hz (see FIG. 3A). The detected edge signal is provided to the VF signal processing unit 108.

The edge signal detection unit 106 filters each frame in the HFR video signal at a frame rate of 240 Hz in horizontal and vertical high pass filter processes so as to detect an edge signal corresponding to each frame at a frame rate of 240 Hz (see FIGS. 3B, 3C, 3D, and 3E). The detected edge signal is provided to the edge signal generation unit 107.

The edge signal generation unit 107 finds the difference absolute value between the edge signals of each frame and the adjacent frame, using the edge signal of each frame (see FIGS. 4B, 4C, 4D, and 4E). Then, the edge signal generation unit 107 generates an edge signal corresponding to each frame at a frame rate of 60 Hz by summing the difference absolute values of the four frames every four frames. The generated edge signal is provided to the VF signal processing unit 108.

The VF signal processing unit 108 synthesizes the edge signal corresponding to each frame at a frame rate of 60 Hz and generated with the edge signal generation unit 107 onto the normal speed video signal at a frame rate of 60 Hz provided by the frame rate conversion unit 104 so as to generate the first video signal for a viewfinder display. In this example, the VF signal processing unit 108 synthesizes the edge signal onto the video signal so that the edge is highlighted (for example, by a bright display or a display with a predetermined color including white).

The VF signal processing unit 108 synthesizes the edge signal corresponding to each frame at a frame rate of 60 Hz and detected with the edge signal detection unit 105 onto the normal speed video signal at a frame rate of 60 Hz provided by the frame rate conversion unit 104 so as to generate the second video signal for a viewfinder display. In this example, the VF signal processing unit 108 synthesizes the edge signal onto the video signal so that the edge is highlighted (for example, by a bright display or a display with a predetermined color including white).

The VF signal processing unit 108 synthesizes both of the edge signal corresponding to each frame at a frame rate of 60 Hz and generated with the edge signal generation unit 107 (the first edge signal) and the edge signal corresponding to each frame at a frame rate of 60 Hz and detected with the edge signal detection unit 105 (the second edge signal) onto the normal speed video signal at a frame rate of 60 Hz provided by the frame rate conversion unit 104 so as to generate a third video signal for a viewfinder display. In this example, the VF signal processing unit 108 synthesizes the edge signals onto the video signal so that the edge is highlighted (for example, by a bright display or a display with a predetermined color including white).

The VF signal processing unit 108 selectively outputs one of the first video signal, the second video signal, and the third video signal, for example, in response to the user's selection operation. As described above, the video signal for a viewfinder display output from the VF signal processing unit 108 is transmitted to the VF display unit (the viewfinder).

Figure 5A:
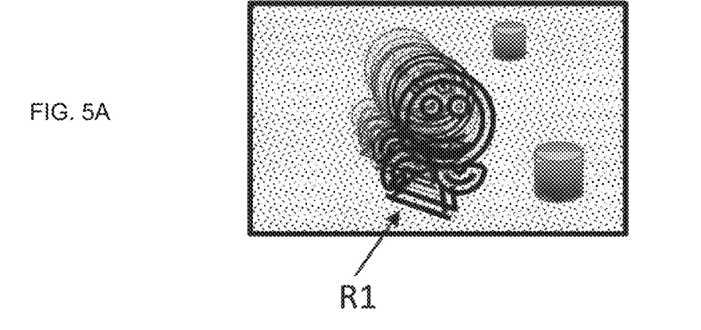
FIGS. 5A, 5B, and 5C are diagrams of an exemplary image shown in a viewfinder.

FIG. 5A illustrates an exemplary image of a frame of the first video signal for a viewfinder display to be displayed in the viewfinder. This example illustrates that a focused point is near the stationary part of the front "cylinder". As illustrated in the drawing, only the edge of the "person" that is the moving part is highlighted (see an arrow R1).

Figure 5B:
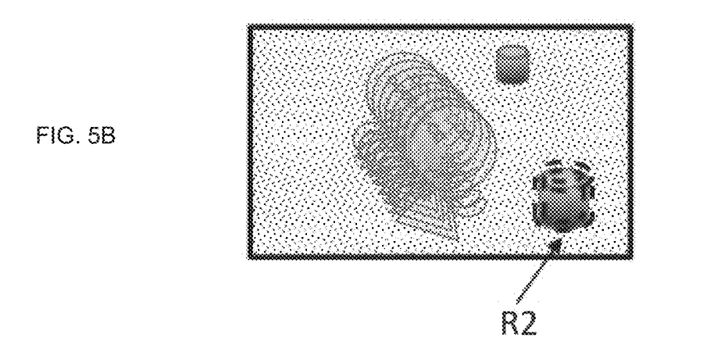

FIG. 5B illustrates an exemplary image of a frame of the second video signal for a viewfinder display to be displayed in the viewfinder. This example illustrates that a focused point is near the stationary part of the front "cylinder". As illustrated in the drawing, only the edge of the "cylinder" that is the stationary part is highlighted (see an arrow R2).

Figure 5C:
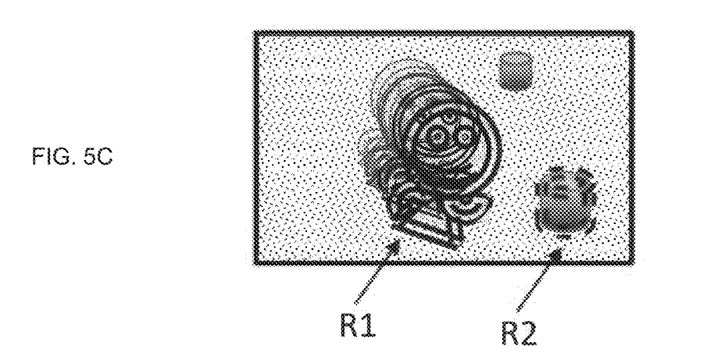

FIG. 5C illustrates an exemplary image of a frame of the third video signal for a viewfinder display to be displayed in the viewfinder. This example illustrates that a focused point is near the stationary part of the front "cylinder". As illustrated in the drawing, both of the edge of the "person" that is the moving part and the edge of the "cylinder" that is the stationary part are highlighted (see arrows R1 and R2).

The camera device 100 illustrated in FIG. 1 provides the video signal (the first video signal) for a viewfinder display by generating an edge signal corresponding to each frame at a frame rate of 60 Hz in accordance with the edge signal detected in each frame of the HFR video signal at a frame rate of 240 Hz and synthesizing the generated edge signal onto the normal speed video signal at a frame rate of 60 Hz. This can, for example, prevent the effect of moving image blurring, and can provide the edge signal of the moving part as the edge signal corresponding to each frame at a frame rate of 60 Hz with good condition. Thus, the edge of the moving part can also be highlighted with the edge signal.

The camera device 100 illustrated in FIG. 1 finds the difference absolute value between the edge signals of each frame and the adjacent frame, using the edge signal detected in each frame of the HFR video signal at a frame rate of 240 Hz, and then generates the edge signal of a frame from some or all of the difference absolute values of the edge signals of the frames every four frames. This enables, for example, an edge highlight display corresponding only to the edge of the moving part.

The VF signal processing unit 108 in the camera device 100 illustrated in FIG. 1 generates the first, second, and third video signals as a video signal for a viewfinder display and selectively outputs one of the first, second, and third video signals. This enables the camera device 100, for example, to display an image in which only the edge of the moving part, only the edge of the stationary part, or both edges of the parts are highlighted by the edge highlight display with the edge signals in the viewfinder.

2. Exemplary Variation

Note that the edge signal generation unit 107 in the embodiment finds the difference absolute value between the edge signals of each frame and the adjacent frame, using the edge signal detected in each frame of the HFR video signal at a frame rate of 240 Hz, and then generates the edge signal of a frame from some or all of the difference absolute values of the edge signals of the frames every four frames. However, the edge signal generation unit 107 can also generate the edge signal of a frame from some or all of the absolute values of the edge signals of the frames every four frames, using the edge signal detected in each frame of the HFR video signal at a frame rate of 240 Hz.

In this exemplary variation, the generated edge signal includes the edge signal corresponding to the edge of the stationary part in addition to the edge signal corresponding to the edge of the moving part (see FIG. 4A). Thus, the first video signal for a viewfinder display provided in this exemplary variation by synthesizing the edge signal corresponding to each frame at a frame rate of 60 Hz and generated with the edge signal generation unit 107 onto the normal speed video signal of at a frame rate of 60 Hz provided by the frame rate conversion unit 104 generated with the VF signal processing unit 108 is identical to the third video signal described in the embodiment.

To simplify the description, the example in which the normal frame rate is 60 Hz has been described in the embodiment. However, the normal frame rate using the present technology is not limited to 60 Hz, and can be, for example, 59.94 Hz or 50 Hz. Furthermore, the present technology can have the configuration described below.

(1) A video signal processing device including:
an edge signal detection unit that detects an edge signal by filtering each frame in a video signal at a second frame rate N times higher than a first frame rate in horizontal and vertical high pass filter processes, the N being an integer larger than or equal to two; and
an edge signal generation unit that generates an edge signal corresponding to each frame at the first frame rate in accordance with an edge signal of each frame detected with the edge signal detection unit.

(2) The video signal processing device according to (1), wherein the edge signal generation unit
performs an arithmetic process to find a difference absolute value between the edge signals of each frame and an adjacent frame, using the edge signal of each frame detected with the edge signal detection unit, and
generates an edge signal of a frame from some or all of the difference absolute values of the edge signals of the frames every N frames.

(3) The video signal processing device according to (1), wherein the edge signal generation unit
generates an edge signal of a frame from some or all of the edge signals of the frames every N frames, using the edge signal of each frame detected with the edge signal detection unit.

(4) The video signal processing device according to any of (1) to (3), further including:
a color conversion unit that converts an edge signal of each frame generated with the edge signal generation unit into a color signal of a predetermined color and outputs the color signal.

(5) The video signal processing device according to any of (1) to (4), wherein the second frame rate is higher than or equal to 200 Hz.

(6) A video signal processing method, the method including:
an edge signal detecting step that detects an edge signal by filtering each frame in a video signal at a second frame rate N times higher than a first frame rate in horizontal and vertical high pass filter processes with a high pass filter, the N being an integer larger than or equal to two; and
an edge signal generating step that generates an edge signal corresponding to each frame at the first frame rate in accordance with an edge signal of each frame detected in the edge signal detecting step.

(7) A camera device including:
a frame rate conversion unit that provides a video signal at a first frame rate from a captured video signal at a second frame rate N times higher than the first frame rate, the N being an integer larger than or equal to two;
an edge signal detection unit that detects an edge signal by filtering each frame in the captured video signal at the second frame rate in horizontal and vertical high pass filter processes;

an edge signal generation unit that generates an edge signal corresponding to each frame at the first frame rate in accordance with the edge signal of each frame detected with the edge signal detection unit; and a signal synthesis unit that provides a video signal at the first frame rate for a viewfinder display by synthesizing an edge signal corresponding to each frame at the first frame rate and generated with the edge signal generation unit onto the video signal at the first frame rate provided by the frame rate conversion unit.

(8) The camera device according to (7), wherein the edge signal generation unit performs an arithmetic process to find a difference absolute value between the edge signals of each frame and an adjacent frame, using the edge signal of each frame detected with the edge signal detection unit, and generates an edge signal of a frame from some or all of the difference absolute values of the edge signals of the frames every N frames.

(9) The camera device according to (7), wherein the edge signal generation unit generates an edge signal of a frame from some or all of the edge signals of the frames every N frames, using the edge signal of each frame detected with the edge signal detection unit.

(10) The camera device according to any of (7) to (9), further including:

a color conversion unit that converts an edge signal of each frame generated with the edge signal generation unit into a color signal of a predetermined color and outputs the color signal, wherein the signal synthesis unit provides a video signal at the first frame rate for a viewfinder display by synthesizing the color signal of the predetermined color corresponding to each frame at the first frame rate and output from the color conversion unit onto the video signal at the first frame rate provided by the frame rate conversion unit.

(11) The camera device according to (10), wherein the color conversion unit determines the predetermined color in accordance with a selection signal from a user operation unit.

(12) The camera device according to any of (7) to (11), wherein the second frame rate is higher than or equal to 200 Hz.

(13) A video signal processing method, the method including:

a framerate converting step that provides a video signal at a first frame rate from a captured video signal at a second frame rate N times higher than the first frame rate, the N being an integer larger than or equal to two;

an edge signal detecting step that detects an edge signal by filtering each frame in the captured video signal at the second frame rate in horizontal and vertical high pass filter processes with a high pass filter;

an edge signal generating step that generates an edge signal corresponding to each frame at the first frame rate in accordance with the edge signal of each frame detected in the edge signal detecting step; and a signal synthesizing step that provides a video signal at the first frame rate for a viewfinder display by synthesizing an edge signal corresponding to each frame at the first frame rate and generated in the edge signal generating step onto the video signal at the first frame rate provided in the frame rate converting step.

(14) A camera device including:

a frame rate conversion unit that provides a video signal at a first frame rate from a captured video signal at a second frame rate N times higher than the first frame rate, the N being an integer larger than or equal to two;

a first edge signal detection unit that detects an edge signal by filtering each frame in the captured video signal at the second frame rate in horizontal and vertical high pass filter processes;

an edge signal generation unit that generates a first edge signal corresponding to each frame at the first frame rate in accordance with the edge signal of each frame detected with the first edge signal detection unit;

a second edge signal detection unit that detects a second edge signal corresponding to each frame at the first frame rate by filtering each frame in the video signal at the first frame rate provided by the frame rate conversion unit in horizontal and vertical high pass filter processes; and a signal processing unit that outputs a video signal at the first frame rate for a viewfinder display by synthesizing the first edge signal generated with the edge signal generation unit, the second edge signal detected with the second edge signal detection unit, or a third edge signal provided by combining the first edge signal and the second edge signal onto a video signal at the first frame rate provided by the frame rate conversion unit.

(15) The camera device according to (14), wherein the signal processing unit selectively outputs one of the first edge signal, the second edge signal, and the third edge signal in accordance with a selection signal from a user operation unit.

REFERENCE SIGNS LIST

100 Camera device
101 Control unit
102 User operation unit
103 Imaging unit
104 Frame rate conversion unit
105, 106 Edge signal detection unit
107 Edge signal generation unit
108 VF signal processing unit

The invention claimed is:

1. A video signal processing device, comprising:
at least one processor configured to:
generate a converted image signal having a first frame rate, wherein the converted image signal is generated based on an input image signal having a second frame rate higher than the first frame rate;
detect a first edge signal corresponding to each frame in the input image signal;
detect a second edge signal corresponding to each frame of the converted image signal having the first frame rate; and
generate an output image signal based on the detected first edge signal and the detected second edge signal.

2. The video signal processing device according to claim 1, wherein the at least one processor is further configured to:
determine a difference absolute value between the first edge signal of a first frame of the input image signal and a second frame of the input image signal, wherein the second frame is a frame adjacent to the first frame; and
generate a third edge signal of a frame of the input image signal based on the difference absolute value of a plurality of frames of the input image signal.

3. The video signal processing device according to claim 1, wherein the at least one processor is further configured to generate a third edge signal of a frame of the input image signal based on a plurality of first edge signals of a plurality of frames of the input image signal.

4. The video signal processing device according to claim 1, wherein the at least one processor is further configured to:
convert the output image signal of each frame of the input image signal into a color signal of a determined color; and
output the color signal.

5. The video signal processing device according to claim 1, wherein the second frame rate is higher than or equal to 200 Hz.

6. A video signal processing method, comprising:
generating a converted image signal having a first frame rate, wherein the converted image signal is generated based on an input image signal having a second frame rate higher than the first frame rate;
detecting a first edge signal corresponding to each frame in the input image signal;
detecting a second edge signal corresponding to each frame of the converted image signal; and
generating an output image signal based on the detected first edge signal and the detected second edge signal.

7. The video signal processing method according to claim 6, further comprising:
determining a difference absolute value between the first edge signal of a first frame of the input image signal and a second frame of the input image signal, wherein the second frame is a frame adjacent to the first frame; and
generating a third edge signal of a frame of the input image signal based on the difference absolute value of a plurality of frames of the input image signal.

8. The video signal processing method according to claim 6, further comprising generating a third edge signal of a frame of the input image signal based on a plurality of first edge signals of a plurality of frames of the input image signal.

9. The video signal processing method according to claim 6, further comprising:
converting the output image signal of each frame of the input image signal into a color signal of a determined color; and
outputting the color signal.

10. A camera device, comprising:
at least one processor configured to:
generate a first video signal at a first frame rate from a captured video signal at a second frame rate, wherein the second frame rate is higher than the first frame rate;
detect a first edge signal corresponding to each frame in the captured video signal;
detect a second edge signal corresponding to each frame of the first video signal;
generate an output image signal based on the detected first edge signal and the second edge signal;
synthesize the second edge signal onto the first video signal at the first frame rate; and
generate a second video signal at the first frame rate for a viewfinder display based on the synthesized second edge signal.

11. The camera device according to claim 10, wherein the at least one processor is further configured to:
determine a difference absolute value between the first edge signal of a first frame of the captured video signal and a second frame of the captured video signal, wherein the second frame is a frame adjacent to the first frame; and
generate a third edge signal of a frame of the captured video signal from the difference absolute value of a plurality of frames of the captured video signal.

12. The camera device according to claim 10, wherein the at least one processor is further configured to generate a third edge signal of a frame of the captured video signal based on a plurality of first edge signals of a plurality of frames of the captured video signal.

13. The camera device according to claim 10, wherein the at least one processor is further configured to:
convert the output image signal of each frame of the captured video signal into a color signal of a determined color;
synthesize the color signal of the determined color at the first frame rate;
generate the second video signal at the first frame rate for the viewfinder display based on the synthesized color signal of the determined color; and
output the color signal onto the second video signal at the first frame rate.

14. The camera device according to claim 13, wherein the at least one processor is further configured to determine the determined color based on a selection signal received from a user operation.

15. The camera device according to claim 10, wherein the second frame rate is higher than or equal to 200 Hz.

16. A video signal processing method, comprising:
generating a first video signal at a first frame rate from a captured video signal at a second frame rate, wherein the second frame rate is higher than the first frame rate;
detecting a first edge signal corresponding to each frame in the captured video signal;
detecting a second edge signal corresponding to each frame of the first video signal;
generating an output image signal based on the detected first edge signal and the second edge signal;
synthesizing the second edge signal onto the first video signal at the first frame rate; and
generating a second video signal at the first frame rate for a viewfinder display based on the synthesized second edge signal.

17. The video signal processing method according to claim 16, further comprising:
determining a difference absolute value between the first edge signal of a first frame of the captured video signal and a second frame of the captured video signal, wherein the second frame is a frame adjacent to the first frame; and
generating a third edge signal of a frame of the captured video signal from the difference absolute value of a plurality of frames of the captured video signal.

18. The video signal processing method according to claim 16, further comprising:
converting the output image signal of each frame of the captured video signal into a color signal of a determined color;
synthesizing the color signal of the determined color at the first frame rate;
generating the second video signal at the first frame rate for the viewfinder display based on the synthesized color signal of the determined color; and
outputting the color signal onto the second video signal at the first frame rate.

19. A camera device, comprising:
at least one processor configured to:
- generate a first video signal at a first frame rate from a captured video signal at a second frame rate, wherein the second frame rate is higher than the first frame rate;
- detect a first edge signal corresponding to each frame in the captured video signal;
- generate an output image signal based on the detected first edge signal and the first video signal;
- process each frame in the first video signal at the first frame rate to detect a second edge signal corresponding to each frame of the first video signal at the first frame rate;
- synthesize the second edge signal onto the first video signal at the first frame rate; and
- output one of:
  - a second video signal at the first frame rate for a viewfinder display based on the synthesized second edge signal,
  - the second edge signal, or
  - a third edge signal generated based on a combination of the first edge signal and the second edge signal onto the first video signal at the first frame rate.

20. The camera device according to claim 19, wherein the at least one processor is further configured to selectively output one of the first edge signal, the second edge signal, or the third edge signal based on a selection signal received from a user operation.

* * * * *